Figure 1:
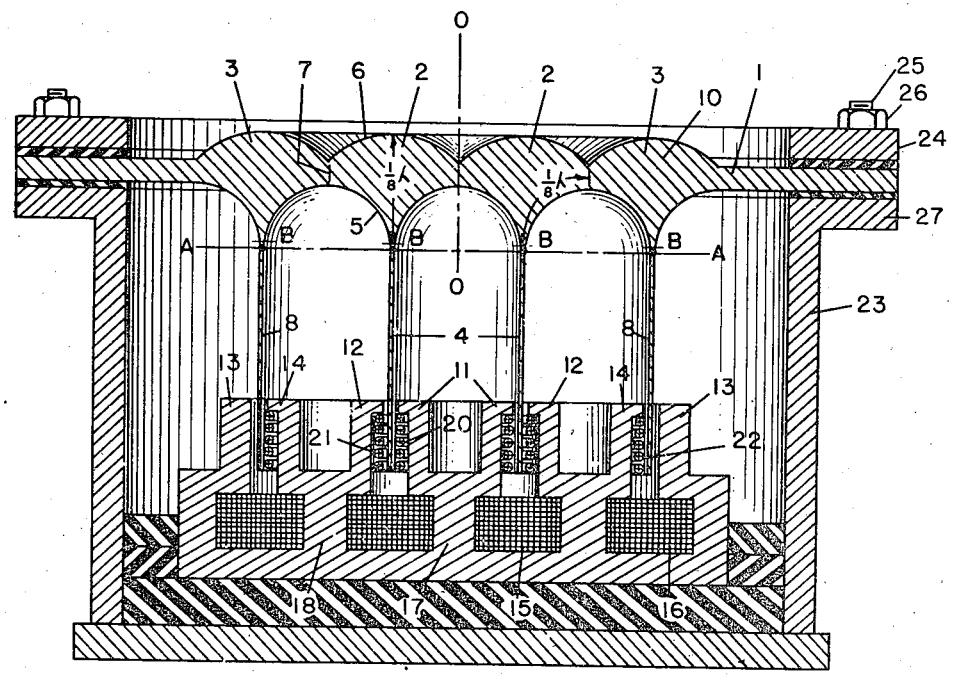

Dec. 24, 1946.  E. E. TURNER, JR  2,413,012
MEANS FOR PRODUCING MECHANICAL VIBRATIONS
Filed July 28, 1938  2 Sheets-Sheet 1

INVENTOR.
Edwin E. Turner Jr.
BY
ATTORNEY.

Dec. 24, 1946.  E. E. TURNER, JR  2,413,012
MEANS FOR PRODUCING MECHANICAL VIBRATIONS
Filed July 28, 1938  2 Sheets-Sheet 2

INVENTOR.
Edwin E. Turner Jr.
BY
ATTORNEY.

Patented Dec. 24, 1946

2,413,012

UNITED STATES PATENT OFFICE 2,413,012

MEANS FOR PRODUCING MECHANICAL VIBRATIONS

Edwin E. Turner, Jr., West Roxbury, Mass., assignor, by mesne assignments, to Submarine Signal Company, Boston, Mass., a corporation of Delaware Application July 28, 1938, Serial No. 221,767

10 Claims. (Cl. 177—386)

The present invention relates to a means for producing a supersonic beam or high frequency mechanical vibrations particularly in water or in mediums providing considerable stiffness or load upon the member effecting the transfer of the energy from the producing device to the propagating or absorbing medium.

Ordinarily, as, for instance, in air, a radiating or vibrating member may have considerable amplitude, but when a load is placed upon the radiating member, it is found that the amplitude is practically damped out. The reason for this is that the force moving the radiating member is at its maximum only sufficient to overcome a small load or small friction and, therefore, when the opposing force exceeds this amount, the whole motion is blocked.

In order to overcome this defect it is common to gear down the amplitude as it were and step up the force until such a force is provided that it will be sufficiently large, not only to overcome the internal friction, but also to provide a substantial working force to vibrate the necessary or desired load.

This gearing up of the force and gearing down of the amplitude is commonly accomplished by the use of masses and elastic elements. In a system having two equal masses joined through an elastic element, as, for instance, a spring, the amplitude of the masses will be equal and so also the forces. If the masses are unequal, the larger mass will have the larger force and the smaller amplitude, the forces being substantially proportional to the masses and the amplitudes inversely proportional to the masses.

In the art of subaqueous signaling, water presents a considerable load on the radiating surface so that the transformation must be to increase the force and a corresponding increase of mass before the useful operating amplitude is obtained. In fact, I have determined that for higher frequencies, that is for frequencies in the supersonic range, sufficient amplitude transformation for the available driving means is, for the most part, not easily obtainable.

In the art as presently understood a mass as distinguished from an elastic element is an element that may be assumed to be rigid in its entirety and which has no differential motion in the various parts of the element, but rather every part of the element moves as every other part.

It will be readily understood that a mass as defined above allows for no wave motion in its parts so that when the dimensions of the mass become comparable with wave length of the vibrations propagated in the mass as a medium, a limit is reached in the magnitude of the mass. As the vibrating frequency is increased, therefore, the maximum obtainable mass is decreased since the dimension within which wave motion may occur is also decreased. In supersonic frequencies I have found that this presents a serious problem and as a rule it is not easy to obtain a large enough mass to effect as great an increase in force as is necessary to vibrate effectively a water medium. Any means, therefore, to increase effectively the mass of the radiating element is welcome in the design of such apparatus.

Unfortunately the problem of obtaining sufficient mass ratio in a vibrating system of the type described above is not the only complication or limitation in the design of a vibrating system moving at so-called supersonic frequencies. Where a beam of supersonic sound is to be produced, the vibrating or radiating element should move in all its parts together. If extraneous motions are introduced because of the choice of the places where the forces are applied, the vibrating or radiating element may not move in all its parts in the same phase. This may affect the configuration of the beam, causing more of spread, and, further, it may affect the mass ratio of the system to produce a decrease in effective force and therefore allow a greater damping by the water on the system in which the transformation takes place. This effect even takes place, the inventor has determined, in a uniform plate that is driven simultaneously at many points of its surface by means of individual rods or tubes and is due in part to the lack of stiffness in the plate itself as shown in the production of transverse wave motion in the plate, particularly in the long dimensions of the plate, and in part to discontinuity of surface between the driving elements and the plate since the driving elements contact the plate only at certain points and not over the whole surface.

These factors which the inventor has discovered have led to a construction of a supersonic vibrator that avoids the difficulties set forth above.

The inventor has made numerous tests on a vibrating system in which a plate was driven by uniform vibrating rods or tubes. In these tests as the plate thickness is increased, the frequency of the system for the production of maximum amplitude decreases uniformly up to a certain point. Beyond this point the rate of decrease of frequency may be substantially uniform but at a different and slower rate from that initially observed. With further increase in plate thickness it was found that the cycle repeats itself.

These observations indicate that the increase of mass to the system initially is uniformly effective up to the point where the frequency begins to change less rapidly, which point may be called the critical point. After this point, apparently more of the mass in proportion takes part as an elastic element and in proportion the frequency drops less rapidly with a proportionate increase in mass.

This point which the inventor calls the critical point may vary somewhat in various combinations but for the most parts, in most structures it occurs at about ⅛ of a wave length of the compressional wave in the material making up the mass.

In the construction according to the present invention this factor has been observed and incorporated in such a way that the travel path through the material is always ⅛ of a wave length long.

As has been stated above, where a beam of supersonic sound is to be produced, the vibrating or radiating element should produce a wave front in which all points have the same phase. In fact, under ordinary conditions the diameter of the piston at the radiating source may be from 6 to 10 times the wave length so that in the vibrating material itself the surface dimensions must always be many times the dimension of ⅛ of a wave length mentioned above to produce the result desired. This means that if any wave motion occurs in the long dimensions of the material, this wave motion will be reflected in the reduction of the mass of the radiating element or of the units of the radiating element which make up the total radiating surface. The inventor has overcome this effect to some extent by the use of a great number of vibratory tubes driving the radiating element at a great number of points. However, even in this construction the maximum mass ratio which is desired can not be obtained.

In the present invention the applicant has developed a vibratory unit in which the path of propagation of the wave is controlled in such a fashion that every path of propagation is substantially of the dimension which will produce the maximum of mass reaction on the driving means.

Figure 2:
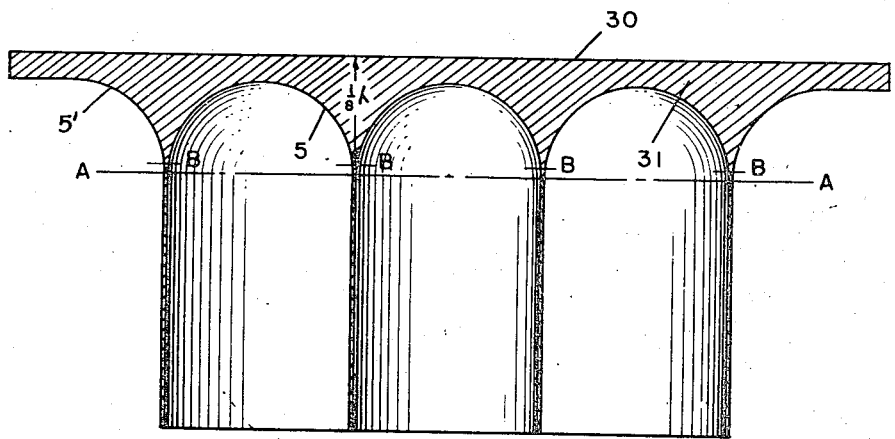
Figure 3:
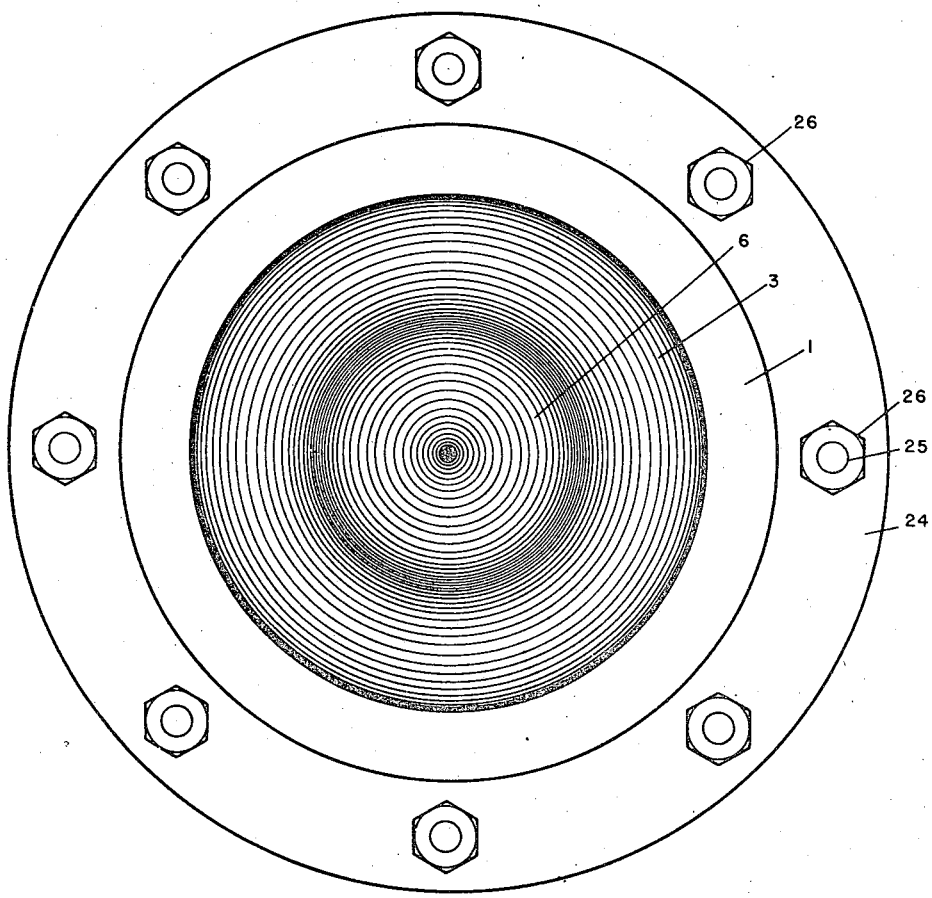
Figure 4:
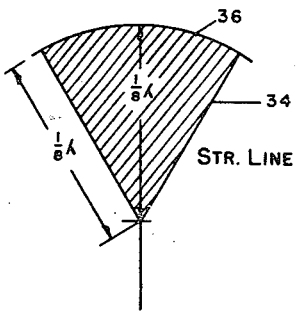
Figure 5:
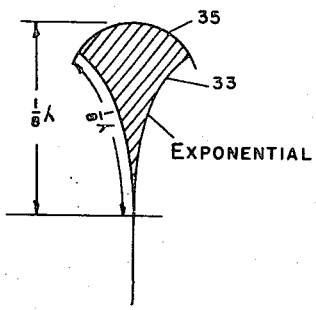

The effect of these combined features will readily be understood by a consideration of the specification below taken in connection with the drawings in which Fig. 1 represents a sectional view of the device in one of its forms; Fig. 2 shows a modified form of the radiating element; Fig. 3 shows a top view of Fig. 1; Figs. 4 and 5 show different forms of sectional elements which might be used to make up the radiating unit.

In Fig. 1 the radiating unit as a whole is designated at 10. This comprises an outer ring element 1 and inner elements made up of sections of revolutions symmetrical with the axis 0—0, one section of revolution comprising the element 2 which has a top arcuate surface 6 and a lower arcuate surface 5 merging into a thin long section 4. When the section of revolution is completed about the axis 0—0, the lower sectional element 4, which in section is a thin flat member which may be called a stem extending from the horn of revolution, becomes a cylinder or cylindrical stem and the upper portion forms on its lower surface a flared-up cone externally flared on one side and internally flared on the other side. The upper surface 6 has a raised surface raised from a lower center point along the axis 0—0 receding again at the external periphery of the surface. In Fig. 1 the vibrating element 10 may be made up of a number of these surfaces positioned each further from the center axis 0 as indicated by the section 3 which joins the section 2 in the web 7. This section 3 with its elongated section 8 is formed with its axis of revolution about the center 0—0 so that a cylinder is formed by the elements 8—8 with a top section 3 extending about the periphery of the entire radiating unit as more clearly shown in Fig. 3. The system, therefore, is formed with a group of concentric cylinders, each of which emerges or flares out into horn-type sections, the boundary surface of which, for instance, the surface 7, is cylindrical and has for its central axis the line 0—0.

The vibrating element 10 is energized through the cylindrical elements 4 and 8. These may be energized either through magnetostrictive action, electromagnetically or electrodynamically. The latter form is herein indicated. The ends of the cylinders 4 and 8 are situated in a magnetic field formed by the poles 11, 12 and 13, 14, respectively. These poles are energized by the coils 15 and 16, the coil 15 surrounding the inner core 17 and the coil 16 surrounding the outer core 18. Within the magnetic field formed between the poles 11 and 12 are the coils 20 and 21, 20 being on the inside of the cylinder 4 and 21 being on the outside of the cylinder 4. These coils carry alternating current and induce an alternating current into the end of the cylinder 4 which is conductive. The cylinder 8 is likewise conductive and has alternating current induced in it by means of a coil 22. The vibrating unit 10 is held tightly in the casing 23 by means of the clamping ring 24 and the bolts and nuts 25 and 26, respectively, which clamp the unit to the flange 27 extending outwardly from the casing 23. The vibrating force applied through the energizing coils set up oscillations in the vibrating unit formed by the elements of revolution 2—4, 3—8, the elements 4 and 8 being elements of uniformly distributed mass and elasticity and the elements 2 and 3 serving as masses to effect the desired mass ratio in the system.

In the system as shown in the drawing of Fig. 1 the node is produced along the line A—A with the portion of the tubes 4 and 8 below this line furnishing a one-quarter wave length tube. The upper portions of the vibrating unit are designed to have the minimum of wave motion so that the phase velocity in these portions of the system is very low. This is brought about by designing the path of normal travel of the acoustic wave in the material such that no path length from the point of beginning of the mass B to another point of boundary in the section itself is greater than ⅛ of a wave length. As the wave energy travels up the cylinders 4 and 8, the forces applicable beyond the "A" node are in such a direction in normal travel as to spread out in paths following the general contours of the shapes of the sections so that every path to the front surface of the vibrating element is approximately ⅛ of a wave length. In this manner even though the vibrating surfaces have lateral dimensions that are many times the wave length, the effective mass obtained is the greatest and substantially no wave motion occurs even in the long dimensions of the material. It will be noted in this respect that at the boundary surfaces between sections, as, for instance, the boundary surface 7, the wave motion from each section being equal and opposite in direction to the wave motion from the other section, these components cancel out and no transverse wave occurs. Preferably the material of the sections 2 and 3 and also the web or rib 1 is made of similar material as that of the tubes 4 and 8. Aluminum which has a high ratio of velocity to density is preferable, since although the material is lighter than other metals, the mass ratio for a given configuration is unchanged by the density of the material used and this metal provides a high ratio for a given water decrement and an efficient driving system. Other metals may be used such as beryllium copper, magnesium alloys and other alloys of aluminum and copper.

In the arrangement shown in Fig. 2 the design is substantially like that in Fig. 1 with the exception that the outer face surface 30 of the radiating element 31 is flat over its whole area. While the path length of acoustic propagation in this type of vibrating unit is not for all paths an eighth of a wave length, it is substantially so for all direct paths to the front surface. The surface contours 5 and 5' may be portions of cylinders or exponential curves as shown by 33 in Fig. 5, or a straight line as shown by 34 in Fig. 4. In each case the top surface should be made the normal or equi-potential surface for the contour surfaces that are used so that the top surface 35 should be normal to the contour surface 33 and the top surface 36 should be normal to the contour surface 34. Where a straight line is used, as in Fig. 4, the surface 36 is an arc of a circle. By establishing the outer vibratory surface in this fashion the normal progress of a propagated wave would always be normal to successive equi-potential surfaces in the material itself.

It will be readily understood that other types of surfaces may be used as long as the principle of the present invention is carried through. It should also be noted that the cylinders 4 and 8 may be made of magnetostrictive material, in which case the coils surrounding the tubes would be made to induce magnetic lines of force along the length of the tube.

It may also be remarked that in the present invention a system is set up as one-half wave length system with the mass distributed uniformly on one side of the node as in the cylinders 4 and 8 and concentrated on the other side of the node as described in the specification, the phase velocity in the two portions being such that the nodes in the tubes are produced in a plane perpendicular to the axis of the tubes near the mass.

Having now described my invention, I claim:

1. Means for producing mechanical vibrations comprising a vibratory half-wave element composed of a plurality of concentric elements of revolutions forming at one end a plurality of concentric tubes and at the other end a solid structure having elements flared out from the concentric tubes to meet one another in peripheral rings, means for supporting said vibratory structure at its outer edge and means for applying vibratory forces at the free ends of the tubes comprising electromagnetic means for producing uniform force, in phase, around the circumference of the tubes.

2. Means for producing vibratory motion at frequencies above the range of normal audibility or in the upper range of audibility comprising a vibratory half-wave length structure consisting of a plurality of concentric tubes with one end of the tubes free and the other ends flaring out to a solid surface formed as a surface of revolution with the axis of the concentric rings as a center, each section of revolution being in the shape of a horn in the inner surface with a concaved curved outer surface having substantially paths for uniform distribution of acoustic waves in the material from the cylinder end to the external curved solid surface, means for flexibly clamping the solid end of the vibrating element and means for driving the free cylinder ends comprising electromagnetic means for producing uniform force, in phase, around the circumference of the tubes.

3. Means for producing mechanical vibratory energy in the upper range of or above the normal acoustic frequency range comprising a vibratory element formed of repeated sections of revolution shaped in the form of a stem flared out in a horn shape with a convex curved top surface, the sections being dimensioned whereby all acoustic paths from the stem to the external curved surface which the acoustic energy normally takes have substantially ⅛ of a wave length, the sections of revolution being joined together in a thin web with elements all lying parallel to the axis of revolution, means supporting said vibratory structure at its periphery and means for applying mechanical energy at the unsupported ends of the structure including electromagnetic means for producing uniform force, in phase, around the circumference of the tubes.

4. In a means for producing vibratory energy of a frequency above or in the upper end of the acoustic audible range, a vibratory structure formed of repeated sections of revolution all developed about a single concentric axis, said sections comprising a stem with a horn section at one end extending into a flat surface normal to the stem, all the sections thereof forming a continuous flat surface extending over all the sections of the structure.

5. In a means for producing mechanical vibrations of a frequency above the acoustic range in an extended surface of dimensions many times the wave length of the mechanical wave in the material of the surface, comprising a vibratory element formed with said extended surface having repeated elements symmetrical with a center axis, said system comprising units made up of substantially uniformly distributed mass and elastic elements and concentrated mass elements coupled thereto in which the normal acoustic path of transmission of an acoustic wave is not more than approximately ⅛ of a wave length in the material.

6. In a device for producing a mechanical vibration of a frequency above the audible range, a vibrating unit formed on one side as a plurality of concentric tubes with arched sections in between and on the other side as a continuous surface, the concentric tubes and the rest of the radiating element forming a vibratory system with the nodes positioned in a plane normal to the tubes and substantially near their non-free ends, the free ends of said tubes being immersed in a constant magnetic field and a plurality of coils also positioned in said field, inside and outside of said tubes adapted to be energized at alternating current of a frequency in or above the audible range at which the structure produces maximum vibrations for a one-half wave length system.

7. Means for producing mechanical vibrations comprising a vibratory half wave length system composed of concentrated mass elements and uniform longitudinal tubes extending from the ends of said mass elements, said concentrated mass elements being flared out from the end of said tube into substantially the form of a horn of revolution with a radiating surface at the front of said horn, said half wave length system having its node positioned substantially at the base of the tube near the beginning of said horn.

8. Means for producing mechanical vibrations comprising a vibratory half wave length system composed of a plurality of concentric elements having shapes symmetrical with a center axis with any section thereof through said axis substantially in the shape of a horn with a stem extending from the small end of the horn, the material included in said horn sections being a concentrated mass with said stem, a uniformly distributed mass having free longitudinal vibration, said concentrated and distributed mass of the horn and stem respectively producing a vibratory system with a node at the end of the stem near the beginning of the horn.

9. Subaqueous signaling apparatus comprising a plurality of concentric tubes from each of which extends solid horn structure geometrically defined by rotation about the axis of the tube of a solid structure progressively increasing in thickness from the tube and merging with adjacent structure to define a radiating member.

10. Subaqueous signaling apparatus comprising a radiating member having a plurality of concentric grooves defining rings each progressively decreasing in thickness from the bottom of the grooves defining it and extending beyond a nodal plane as a concentric tube of substantially uniform thickness.

EDWIN E. TURNER, Jr.